UNITED STATES PATENT OFFICE.

WALTER SCHOELLER AND MAX GEHRKE, OF BERLIN, GERMANY, ASSIGNORS TO FIRM: CHEMISCHE FABRIK AUF ACTIEN (VORM E. SCHERING), OF BERLIN, GERMANY.

PHARMACEUTICAL PRODUCT CONTAINING ARSENIC AND PROCESS OF MAKING SAME.

No Drawing. Original application filed June 22, 1925, Serial No. 38,902, and in Germany July 2, 1924. Divided and this application filed August 9, 1926. Serial No. 128,334.

Our invention relates to pharmaceutical products and more especially to arsinic acid derivatives and to the method of making same. This application is a division of application Serial No. 38,902 filed June 22, 1925.

In treating an alkaline solution of p-hydroxy-m-amino-benzene arsonic acid at 0° C. with a solution of phosgene in toluene Fargher (Fourn. Chem. Soc. 115 (1919), p. 991) obtained 1.2-dihydro benzoxazolon-4-arsonic acid the arsenic content of which was found to be 28.6 per cent against 28.9 per cent as calculated.

We have now ascertained that, contrary to what could be expected, when working without any cooling and preferably at a temperature between 25 and 80 degr. C., there results the symmetrical urea of p-hydroxy-m-amino benzene-arsonic acid the arsenic content of which was ascertained to be 30.2 per cent, as against a theoretical content of 30.4 per cent. This compound corresponds to the formula

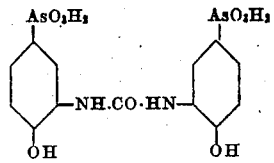

As compared with for instance p-hydroxy-m-acetyl-amino-benzene-arsonic acid, it is more permanently effective and has a higher chemotherapeutic coefficient as no saponification occurs in the organism.

Products which equal, if not exceed the above in activity, are obtained if p-hydroxy-m-amino-benzene-arsonic acid is aminobenzoylized and the m-(m-amino-benzoylamino) p-hydroxy-benzene-arsonic acid is converted by treating with phosgene into the corresponding urea

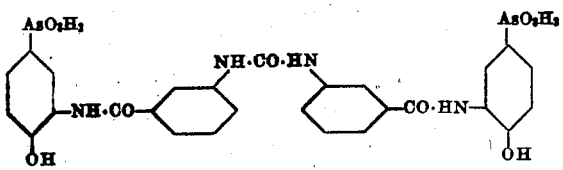

*Example.*—If 7.9 grams p-hydroxy-m-amino-benzene-arsonic acid, dissolved in the form of its sodium salt, are acted upon according to Schotten-Baumann's method with 9.3 grams m-nitrobenzoyl chloride, there are obtained 12.5 grams m-(m-nitrobenzoyl amino) p-hydroxy-benzene-arsonic acid, which can be converted by reduction with ferrous salt into m-(aminobenzoyl amino) p-hydroxy-benzene-arsonic acid. This latter is dissolved in a soda solution and is subjected to the action of phosgene, until no further diazo reaction can be traced. Upon acidulation there results the symmetrical urea of m-(m-aminobenzoyl amino) p-hydroxy-benzene-arsonic acid which is a yellow amorphous powder soluble in alkalis, but insoluble in the usual organic solvents.

Various changes may be made in the details of the operation and particularly in the proportions of the ingredients present in the solutions used without departing from the invention or sacrificing the advantages thereof.

We claim:—

1. As a new product, the symmetrical carbonyl urea of m-(m-amino benzoyl amino) p-hydroxy benzene-arsonic acid, corresponding to the formula

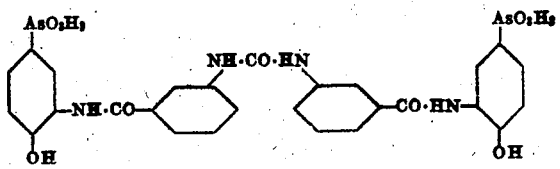

being a yellow amorphous powder soluble in alkalis, but insoluble in the usual organic solvents.

2. The method of making a symmetrical urea of a derivative of p-hydroxy-m-amino-benzene-arsonic acid, comprising aminoacidylizing said acid and acting on the product of reaction with phosgene in an alkaline solution while avoiding cooling the reaction mixture.

3. The method of making a symmetrical urea of a derivative of p-hydroxy-m-amino-benzene-arsonic acid, comprising aminobenzoylizing said acid and acting on the product of reaction with phosgene in an alkaline solution while avoiding cooling the reaction mixture.

4. The method of making a symmetrical urea of a derivative of p-hydroxy-m-amino-benzene-arsonic acid, comprising acting on said acid with m-nitrobenzoyl chloride, reducing the product obtained to form m-(amino benzoyl amino) p-hydroxy-benzene-arsonic acid and acting on this latter product with phosgene in an alkaline solution while avoiding cooling the reaction mixture.

In testimony whereof we affix our signatures.

WALTER SCHOELLER.
MAX GEHRKE.